United States Patent Office 2,741,894
Patented Apr. 17, 1956

2,741,894
PROCESS OF PREPARING YARNS

Leroy E. Schulze, Minneapolis, Minn., assignor to Regents of The University of Minnesota, Minneapolis, Minn., a corporation of Minnesota No Drawing. Application May 28, 1953, Serial No. 358,193

15 Claims. (Cl. 57—164)

This invention relates to the preparation of fine linen yarns from mature, field-ripened seed flax. More particularly, the invention relates to the preparation of fine, soft, linen yarns for the production of quality linen fabrics from the coarse, harsh straw remaining after harvesting of seed for linseed oil production, which straw had been deposited at random on the field by the combine harvester.

Flax has been grown from time immemorial for the production of fibers for use in making linen. Down through the centuries strains have been developed to produce the longest, straightest, finest, softest and most uniform fibers. Extreme care is taken at every stage in fiber flax production. It is essentially a hand operation. For that reason the production of flax for fiber is limited primarily to areas of relatively cheap labor. Because of favorable soil and climatic conditions and density of population, the low countries of Europe are admirably suited for the production of quality fiber flax. Fiber flax is seeded heavy to produce long, fine, straight stems. It is harvested early before the stems completely lose their green color and before the seeds are fully matured. Fiber flax is pulled from the field rather than being cut off near the ground. It is pulled either by hand or by a mechanical puller, but care is taken to keep the stems straight and in parallel alignment. It is customary to tie the pulled stems into bundles for convenience in movement through the dam or tank retting. The flax is processed through the further treatments of breaking, scutching and hackling in small hanks commonly known as "a hand." Although machinery is now used in most of these treatments, much personal care is taken and skill required in each stage of the operation in order to feed the flax carefully into the machinery and to keep the fibers parallel and aligned at all times.

In contrast to the fiber flax production methods, most flax grown in this country and other countries for linseed oil production is bred for high oil yield from the seed. Strains of flax have been developed to be disease resistant and to yield the maximum seed production. These are relatively short, sturdy, branched plants with multiple seed bolls. Seed flax is sowed at a lower rate of seed per acre in order to produce heavy, coarse stems to support the heavy seed bolls and to prevent lodging of the crop. Flax production is essentially a machine operation. The seed is allowed fully to mature and ripen in the field. It is then usually cut and laid in swaths in the field to dry. Thereafter, it is threshed to separate the seed from the straw. After the harvesting of the seed, the straw remaining is a waste product and is usually plowed under or burned, although a small amount is used for the production of cigarette paper and other special papers. Because the flax plants are allowed to grow to the full maturity of the seed, the fibers of the straw become harsh and coarse. This is the product which is used to produce fine linen yarns according to this invention. Many attempts have been made in the past to utilize seed flax straw to produce linen yarns, but until this invention none of these have been economically feasible.

It is the principal object of this invention to utilize the harsh, coarse straw remaining after separation of seed for linseed oil production to produce fine, soft, linen yarns.

It is another object of this invention to prepare fine linen yarns from mature, field-ripened seed flax.

It is a further object of this invention to treat mature field-ripened seed flax straw in the field to condition it for the production of fine soft linen yarns.

A still further object of this invention is to utilize a waste seed flax straw economically to produce fine linen yarns.

Other objects will become apparent as the description proceeds.

To the accomplishment of the foregoing and related ends, this invention then comprises the features hereinafter fully described and particularly pointed out in the claims. The following description sets forth in detail certain illustrative embodiments of the invention, these being indicative, however, of but a few of the various ways in which the principle of the invention may be employed.

Broadly stated, the invention is a process of preparing fine linen yarns from mature seed flax which comprises the steps of mowing the field-ripened seed flax, separating the seed from the straw in the field, depositing the separated flax straw on the cut-over stubble field, subjecting the flax straw to a field weathering treatment, decorticating the weathered straw to substantially free the bast fibers from the shivey material, forming a roving of the bast fibers, conditioning the fibers for spinning by contacting with an aqueous treating agent, drafting the fibers while still wet and spinning the fibers into yarns.

Flax grown for seed is planted lighter than flax grown for fibers. Seed flax strains have been developed for maximum seed production and the multiple-branched tops and numerous seed bolls require heavier, coarser stems for support of the seeds. Fiber flax is sown heavy to force the plants to grow tall and straight and the small seed production is of minor concern. Seed flax is sown at a lower rate and in wider rows to permit the increased branching and to develop sturdy, short stems to resist the danger of lodging, that is, being thrown or beaten down by wind or rain. For maximum seed production the flax is allowed to mature fully in the field as distinguished from fiber flax which is harvested somewhat before full maturity in order to harvest it at the time for best fiber production.

MOWING

Seed flax is mowed or cut rather than pulled, as is the case with fiber flax. It is usually cut and laid in swaths or condensed windrows with the heads of the grain upward and then left for several days to dry before threshing. Seed flax can be harvested as a standing crop, but a windrowed, well-dried crop usually produces better threshing conditions. The stems should not be cut too close to the ground. The stubble should be long enough to support the swath of flax off the ground to provide good drying. Normally, this would require a stubble of from 4 to 8 inches in length. The flax is normally allowed to stay in the swath for from about four days up to about eight to ten days. Any weeds which may be present are dried out so that they may be readily broken up and removed during the threshing operation.

THRESHING

The dried flax is usually harvested by combining. A drawn or self-propelled combine moves across the field, gathers up the swaths of dried grain, separates the seeds from the straw, deposits the seed in a grain bin and discards the straw in a continuous stream onto the stubble. The separation of the seed and the straw takes place as the result of a rubbing action upon the grain as it passes between a rotating cylinder and a concave member partially surrounding the cylinder and slightly spaced apart from it. These separators are of two general types. One is of the rub or rasp bar type and the other of the spike tooth type. The rub bars or rasp bars may be of metal or rubber and are arranged generally longitudinally on the outside perimeter of the cylinder. The corresponding co-acting concaves are likewise of metal or rubber. The separation takes place with a minimum of breaking and chopping of the straw. The spike tooth separator consists of a cylinder having teeth projecting radially outwardly and concaves having spiked teeth projecting radially inwardly to intermesh with the teeth on the cylinder. Because the separation here takes place as the result of a pulling or tearing action, the straw is generally broken and chopped up. Straw from flax harvested with a spike tooth type of combine is generally unsuitable for the production of fine linen yarns. It is not only chopped up and broken, but when deposited back on the field tends to lie in matted windrows which become damp and soggy and do not dry out readily, this being a disadvantage in the present invention. The straw from a rub or rasp bar type combine is unbroken and is deposited in light, fluffy windrows which stay on top of the stubble. Since this flax has been grown for its seed and that seed has now been harvested, the straw which remains lying on the field is essentially a waste product. In the past, it has been customary to dispose of much of this straw by burning it in the field.

FIELD WEATHERING

In order to condition the straw left after harvesting for use in the preparation of linen yarns, it is, according to the present invention, first subjected to a field weathering treatment. Thus, the straw, as deposited in windrows on the stubble by the rubber-roll or rasp-bar type harvester is left exposed to the weather for a controlled period during which the straw is field weathered and changed. This treatment consists in exposing the straw to the elements in order partially to break down the woody structure of the plant. The flax straw is made up of a pulpy cellulosic core surrounded by a thin layer of bast fibers and covered by a woody cortex, all bound together with various sugars, pectins, gums and like mucilaginous material. It is the purpose of the controlled field weathering treatment to condition the straw so that the fibrous material can be readily removed from the waste pulpy cellulosic material. This is accomplished by allowing the straw to remain in the field exposed to rain and to sunshine over a period of from several days to several weeks. The action on the straw is three-fold. Some of the water soluble mucilaginous material which holds the bast fibers together and binds the fiber bundles to the shive is dissolved out by exposure to rain or other wetting. Some bacterial or microbiological action takes place, digesting other mucilaginous matter, such as sugars, pectins, gums and the like. Both of these actions serve to return beneficial elements to the soil. Some mechanical action takes place during the field weathering due to the alternate swelling and shrinking caused by the absorption of moisture and subsequent drying. During this field weathering period of the present invention, the straw changes in color from a normal bright yellow at the time of harvesting to a silver-gray. After weathering, the straw is softer and more pliable and is partially opened, with the cellulosic core of the stem seen to be more readily separated from the fibers than was the case before weathering.

The duration of the field weathering treatment depends largely upon climatic conditions. Normally, the straw may be left lying in the field for from about two to eight weeks, during which time it will have been subjected to from about two to ten alternate wettings and dryings, due to rain and sunshine. It is preferred that the straw be subjected to from four to seven alternate wettings and dryings. As used in this specification, wetting is meant to include only a thorough soaking, such as would be obtained by a heavy rain, and is not intended to include a light dampening such would be obtained by dew. It must be understood that the time for which the field weathering treatment is carried out, being dependent upon climatic conditions, is not critical. It is conceivable that under ideal conditions the straw lying in the field might be subject to four nightly rains interspersed with days of bright sunshine, but such conditions would be unusual and extremely unlikely. In the event of extremely dry weather following harvesting, it is contemplated that the straw shall be allowed to remain on the field all winter subject to winter storms, or under a layer of snow, and then be gathered in the spring and processed for yarn production. As an alternative treatment during dry weather, the straw may be artificially wetted in the field by sprinkling. Such artificial wetting may be assisted by the use of wetting agents and hygroscopic agents.

MECHANICAL LIBERATION OF FIBER

After the completion of the field weathering treatment, the straw is subjected to a number of mechanical operations which serve to loosen the bast fibers from the shive and to effect a substantial separation of the shivey material. The first of these treatments is braking. Braking consists of a mechanical manipulation of the straw to loosen and separate the bast fibers from the shivey material. This is usually accomplished by passing the straw between pairs of corrugated rollers which work the straw and tend to break up the harder woody material. This may also be done in the field for the purpose of reducing the bulk of material handled or the field weathered straw may be transported to the processing plant. If done in the field, beneficial cellulosic material is returned to the soil.

Braking is the first step in liberation of the fiber from the inner woody core shives.

It is one of the features of this invention that by use of the herein described precedent controlled field weathering, the straw, which has been deposited in random fashion in windrows, is brought into condition such that mechanical liberation of the fiber can be accomplished readily on the random straw. This is done without the necessity (such as heretofore) of keeping or bringing the straw and fibers into parallelism, as is required in the traditional "line-fiber" modes of producing linen. Thus the field weathered straw of the windrow can be mechanically picked up and then worked while still in random lay by a brake, and much of the shive is liberated, the fibers produced by this operation being still in random position in the form of loose tow. This operation can be done in the field on a continuous basis by portable machine moved along the windrow, and the tow immediately baled in the field for handling, or the intact straw may be baled and carted to a central tow mill where this operation is performed.

The tow (whether produced in the field or at the tow mill) is not in "line-fiber" condition, but it is oriented at random. The next step is preferably to clean the tow in a tow scutcher. For this process step there may be used the "Etrick" or "Forano" tow scutchers, such as have heretofore been used for recovering some of the fiber values from the waste material of the so-called "turbine scutchers," these latter turbine scutchers being used in the production of line fiber from fiber flax by traditional methods. Such ("Etrick" or "Forano" type) "tow scutchers" have heretofore had their principal us in the production of low grade fiber as a by-product of line-fiber production, the scutched tow being used for rug yarns and other coarse applications. I use these machines in the production of tow from seed flax straw which ultimately (in my improved process) yields fine linen yarns. This is possible because of the controlled field weathering treatment step in the process, in combination with the specified processing steps.

Again it is emphasized that in the tow scutcher the fibers are not handled as line fibers but are oriented at random and to a great extent stay so oriented. It may be noted that field weathering allows weeds to dry and these are broken and thrown out to some extent in the brake. Any residue of weed stems, etc. are readily removed by the tow scutcher.

Finally the tow is sent directly to a flax finishing card such as those made by "Fairbairn-Lawson-Comb-Barbour" (Leeds, England) or James Mackie & Sons (Belfast, Ireland). It is a feature of the invention that the so-called flax "breaker card" (which has heavy pins for handling tow that is matted, with consequent rough treatment of the tow) is not required in my invention. The controlled field weathering hereinbefore specified makes the straw so easy to handle that harsh mechanical treatment is unnecessary. In some instances, I have found that it is even possible to pass the lightly broken straw produced by the breaking step directly to the flax finishing card, thus eliminating even the tow scutching operation, or several cards may be used in series.

The flax finishing card produces the desired sliver which can be combed, drafted and formed into a loose roving suitable for handling in drums or winding on bobbins for chemical treatment.

The entire sequence of processing steps from harvesting to production of roving is mechanical and requires only machine supervision. Thus, the appropriately selected combine deposits the straw in a loose windrow on field stubble; after the controlled field weathering the straw is picked up and baled by existing machines and transported to a tow mill or broken (or broken and scutched) in the field, again by a wholly mechanical operation. The resultant tow is baled in the tow mill (or in the field) for handling if shipment must be made to distant chemical treating plant, or the tow can be sent directly to the chemical treating steps to be described. There is none of the hand handling or hand feeding of bundles or other hand size quantities (i. e., "hands") either in the field or in the mill as is required in traditional methods of "line-fiber" linen production.

CHEMICAL CONDITIONING

Because the fibers of seed flax straw are of a heavy, coarse character, it is necessary that they be further treated to allow the individual, or ultimate, fibrils to move one on another, thus drawing the coarse fiber down to a smaller diameter. The precise chemical mechanism of this fiber conditioning is not completely understood, but it is believed that the chemical treatment serves to soften and to effect partial or complete removal of the pectin-like cementitious material which serves in the plant stem to bind the large bast fibers together, and at the same time the treatment effects a softening but not complete removal of the apparently somewhat different pectin-like cementitious material which serves in the plant to cement individual fibrils together to form a bast fiber. There is some evidence to support the belief that there are two related but different types of pectin-like cementitious materials in the plant. The softening and removal of the cementitious material which binds the bast fibers together permits the bast fibers, to a large degree, to separate from each other and at the same time the cementitious material which holds together the fibrils in the individual bast fibers is softened to an extent sufficient to allow the fibrils to slide relative to each other when the treated roving is in a wet condition and is drawn out during spinning. It is to be understood that the explanation given herein is based upon applicant's best belief and knowledge at the present time and is given as an aid to understanding the invention, but is not to be understood as a limitation thereon. The fiber preparation or conditioning treatment may be carried out to some extent by the use of water alone, but preferably an aqueous alkaline solution is employed. Chemical treatment with alkaline reagents which are representative of those which may be employed in conjunction with this invention are disclosed in Patent No. 2,468,771 and applications Serial No. 197,485 and 330,154. The process of the patent comprises generally washing the bast fibers, treating with an aqueous oxidizing solution and then treating with an aqueous alkaline solution. The treatment of the applications comprises generally treating the fibers with an aqueous solution containing both an alkali caustic material and a hydrosulfite of an alkali metal. The invention of this application is not limited to the use of any one of those specific earlier treating processes, but it is contemplated that any one of a variety of similar chemical treatments may be used instead. It is preferred that the conditioner treatment be carried out at an elevated temperature of the order of about 100° C. For convenience the conditioning treatment is usually carried out on a roving wound on a perforated bobbin so that the treating solution may be forced through the roving. It is to be understood, however, that bast fibers in tow form or sliver form may likewise be treated and prepared for spinning by utilizing the treatments hereinbefore described. When these operations are carried out on the bast fibers in the tow form, the fibers after treatment are dried and then worked up into a sliver or roving, using customary machinery. The sliver or roving is then re-wetted for a time sufficient to re-soften the cementitious materials of the bast fibers, and after a suitable interval is spun while wet, suitable draft being applied while spinning. If desired, the treated fibers may be neutralized by treatment with a mild acidic material. In some cases it is also desirable to subject the fibers to a washing step before the conditioning treatment. It has been discovered that a washing step may be advantageous in that about 20% of non-fibrous material is thus loosened and removed. The washing may be carried out using either plain hot water, a mild alkali or a spent solution from the later steps of the conditioning treatment. The washing, when used, is also preferably followed by a cold water rinse.

While the roving is still wet from the conditioning treatment, it is passed through a wet spinning machine in which provision is made for drafting or drawing out the roving while spinning. In such a machine the bobbins of roving are maintained submerged in an aqueous bath from which the saturated rovings are drawn by spaced pairs of rollers operating at increased speed, and the bast fibers are drawn out as they are spun, with the result that a distinct degree of slippage occurs between the fibrils and exceedingly fine yarns may be produced. It is possible when using the process of this invention to produce from hard, dry, mature seed flax straw fine linen yarns ranging in size from 30 lea to 150-175 lea.

It has been found that field weathering materially reduces the amount of alkaline material required for conditioning the fibers for making fine linen yarns as compared with similar processes in which no field weathering occurs. Thus, hard dry seed flax straw without the hereindescribed field weathering may be processed directly, utilizing the methods set forth in the aforesaid patent and applications and linen yarns of good quality and commercial sizes produced. For a given quantity of roving a certain amount of chemical processing materials will be required and a certain amount of ultimate spun yarns will be obtained for each 100 pounds of roving starting material. When using the same chemical treating steps and the same roving made from seed flax straw starting material, but in this instance including the controlled field weathering step, several advantages are gained, namely (1) less chemical supply is required and (2) there is a lesser weight reduction from roving to yarn, i. e. the "yield" of yarn is higher. Thus, there is as much as 10% to 50% reduction in required chemicals and the yield of yarn (calculated on the roving) increases as from 5% to 25%. These advantages are in addition to the overall advantage of straight through mechanical handling and ease of mechanical fiber liberation (which results in a better quality roving).

Some incidental bleaching occurs in the preparation of the fibers during chemical treatment preparatory to drafting and spinning. The fibers themselves or the yarns may be subjected to bleaching, if desired. However, it is generally preferable to bleach in the cloth stage rather than in an earlier stage.

The invention is further illustrated by means of the following specific examples.

*Example I*

A field in southwestern Minnesota in the vicinity of Redwood Falls planted with a commercial variety seed flax (U. S. Department of Agriculture designation B–5128) was allowed to ripen to full maturity for maximum seed production. This fully ripened grain was cut in early August in swaths and discharged in the form of condensed windrows for drying. Five days later the grain was harvested using a combine (John Deere) employing a metal rasp bar separator. The straw was ejected from the combine and deposited at random on the field stubble in the form of loose, light windrows. Because of the action of the separator the straw was in a loose tangled mass but was relatively unchopped and unbroken. It was then allowed to remain lying in the field exposed to the elements for 29 days without further attention. During this time there were six rains of varying intensity interspersed with days of bright summery sunshine. The flax straw was thus subjected to six distinct wettings and dryings. The color of the straw changed during this period from a bright yellow to a silver gray. The straw was soft and pliable and the smooth shiny outer coating appeared to be partially broken. This field weathered straw was then baled and moved to a processing plant.

The field weathered straw bales were opened and the straw was first passed through a gentle acting brake (Van Hauwaert). This consists of a series of pairs of corrugated rollers having relatively deep corrugations longitudinally so that the action of the rolls upon the straw as it passes between them is to cause a bend approaching 180 degrees, with succeeding rolls bending the straw in a number of reversals. This served to crush and break the woody material in the straw and allow it to be separated from the fibers. The brake produced a separation of a substantial part of the inner woody core material. Thereafter the mass of fibers was passed through a tow scutcher (Etrick) which removed substantially all of the remaining shivey material. The fibers were then carded by a flax finisher card which removed the last bits of shive and subsequently aligned the fibers in the form of a heavy sliver. The fibers were then subjected to several operations of combing and drawing and were twisted loosely into a roving. Part of the fiber was then subjected to a chemical conditioning treatment in accordance with Example I of Patent No. 2,468,771. A perforated bobbin having on it approximately one pound of fibers in the form of a roving was placed in a vessel adapted for forcing the treating liquid through the bobbin and alternatively for then withdrawing the fluid in reverse flow through the center of the bobbin. The roving was washed for five minutes with plain water at about 100° C. by alternately forcing the water outward and then drawing it inwardly through the roving on the bobbin. After washing, the roving was subjected for 15 minutes to an oxidizing solution containing 0.03 pound of sodium chlorite and 10 pounds of water for each pound of roving (dry weight) and maintained at about 95° C. The roving was again rinsed with plain cold water and then treated with a caustic alkali solution containing 1% of sodium carbonate and .1% of sodium hexametaphosphate. This treatment was continued for 30 minutes at a temperature of about 95° C. and the roving was again washed with plain cold water. While still wet the bobbin containing the thus prepared and chemically conditioned roving of linen bast fibers was placed in position on spinning equipment for wet spinning and for drafting the roving during spinning. A fine, soft, linen yarn of 40–50 lea was produced.

Another similar portion of the fibers in the form of a roving was conditioned according to the process of application Serial No. 330,154 as follows: The roving wound on a bobbin was washed for several minutes with plain water at about 95° C. Thereafter the bobbin was placed in a pressure vessel containing an aqueous solution made up of 2% sodium hydroxide and 1% sodium hydrosulfite. The temperature was maintained at about 150° C. for two hours. Thereafter, the bobbin was removed and the roving was washed, drafted and spun. The yarn produced had a lea number of about 45–60.

Similarly, using other conditioning treatments, many fine, soft, uniform linen yarns were prepared.

*Example II*

A field in the same general area of southwestern Minnesota, but subject to somewhat different climatic conditions planted with a commercial variety of seed flax was allowed to mature fully. The date of maturity and thus the date of mowing was somewhat later than that in Example I. The grain was cut and laid in swaths for drying. Because of heavy rains after mowing and before threshing, the straw became partially field weathered at this stage. Harvesting was begun some two weeks after the grain had been mowed. Initially a spike tooth combine (J. I. Case) was used. Threshing was extremely difficult because of the partial field weathering of the grain which had occurred. The straw became chopped and broken by the separator and was deposited in relatively dense matted windrows through which air movement was restricted making drying in the field difficult, if not impossible. For this reason, a change was made to a combine equipped with rubber rub bars and rubber concaves. (Allis-Chalmers). The straw from this combine was deposited on the field in light loose windrows. This straw was then allowed to remain exposed in the field for an additional two and one-half to three weeks, during which time there were five relatively heavy rains and many days of hot bright sunshine. This field weathered straw was baled and moved to a processing plant where it was subjected to the same breaking, scutching, carding, combing and drawing operations referred to in Example I above. Similarly, the fibers were divided into many different lots and subjected to several different chemical conditioning treatments. Specifically, one batch of fibers was treated in accordance with application Serial No. 330,154 as follows: A bobbin wound with approximately one pound of fibers on a dry weight basis in the form of a roving was first washed in hot water for several minutes. Thereafter the bobbin was placed in a pressure vessel containing an aqueous solution having therein 0.15% sodium hydrosulfite and 0.5% sodium hydroxide. The vessel was maintained under sufficient pressure to allow the temperature to rise to 120° C. This temperature was maintained for a period of two hours, after which the bobbin was removed and rinsed in a slightly acidic aqueous solution. It was then rinsed in cold water and the roving, while still wet, was passed to a wet spinning machine, drafted and spun. The resulting yarn had a lea number in the range of 50 to 60, was soft, light-colored, and did not require bleaching.

The provision of an extended field weathering treatment will be seen greatly to facilitate the preparation of linen yarns from seed flax straw. What has remained an essentially hand industry in the production of linen yarns from fiber flax requiring individual attention at every stage in the operation has by means of this invention become essentially a mechanical operation. Because of the partial destruction of its basic structure in the field, the field weathered seed flax straw may be used in the same irregular jumbled mass in which it is deposited on the field by the combine. No longer need individual attention be given during the breaking and scutching operations to see that the fibers are parallelly aligned. In some cases when the field weathering is complete, the straw may be put directly through a card without preliminary breaking or scutching. The chemical conditioning of the fibers is facilitated as a result of the field weathering so that only about half as much of the treating chemicals need be used. This in turn facilitates the drafting and spinning of the fibers into fine, soft, linen yarns.

It is apparent that many modifications and variations of the invention as hereinbefore set forth may be made without departing from the spirit and scope thereof. The specific embodiments described are given by way of example only, and the invention is limited only by the terms of the appended claims.

What I claim is:

1. The process of preparing fine linen yarns from mature seed flax which comprises the steps of mowing the field-ripened seed flax, separating the flax seed from the straw in the field, depositing the separated flax straw on the cut-over stubble field, there subjecting the flax straw to a field weathering treatment, mechanically liberating the bast fibers of the weathered straw from the shivey material, forming a roving of the bast fibers, conditioning the fibers for spinning by contacting with an aqueous treating agent, drafting the fibers while still wet and spinning the fibers into yarns.

2. The process of claim 1 in which the cut flax is swathed and allowed to dry in the field before separating the seed from the straw.

3. The process of claim 1 in which the field weathering treatment consists of alternate wettings and dryings.

4. The process of claim 1 in which the field weathering treatment consists of from 2 to 10 alternate wettings and dryings.

5. The process of claim 1 in which the field weathering treatment is carried out over a period of from 2 to 8 weeks.

6. The process of claim 1 in which the field weathering treatment consists of from 4 to 7 alternate wettings and dryings.

7. The process of claim 1 in which the flax seed is separated from the straw in the field by combining and the straw is deposited for weathering upon the cut-over stubble field in windrows.

8. The process of claim 1 in which the fibers are mechanically liberated from the weathered straw by first subjecting the straw to a breaking treatment to remove at least part of the shivey material and then scutching to substantially free the bast fibers from shivey material.

9. The process of claim 1 in which the bast fibers substantially freed from shivey material are carded and formed into a roving before the conditioning treatment.

10. The process of preparing fine linen yarns from mature seed flax which comprises the steps of cutting the field-ripened seed flax in swaths and drying, combining the flax to separate the flax seed from the straw in the field, depositing the separated flax straw in windrows on the cut-over stubble field, subjecting the flax straw to a field weathering treatment comprising exposing the straw while in said windrows to from 2 to 10 alternate wettings and dryings over a period of from 2 to 8 weeks, mechanically liberating the bast fibers of the weathered straw from the shivey material by braking the straw and then scutching, forming a roving of the freed bast fibers by carding to form a sliver and then roving, conditioning the fibers for spinning by washing with water and treating with an aqueous alkaline solution, drafting the wet treated fibers and while still wet, spinning the fibers into yarns.

11. The method of processing mature seed flax for the preparation of clean linen fibers which comprises the steps of cutting the field-ripened seed flax in swaths and drying, combining the flax to separate the flax seed from the straw in the field, depositing the separated flax straw in windrows on the cut-over stubble field, subjecting the flax straw to a field weathering treatment comprising exposing the straw to alternate wettings and dryings while in said windrows, mechanically liberating the bast fibers of the weathered straw from the shivey material by braking the straw and then scutching.

12. The method of processing mature seed flax for the preparation of fine linen yarns which comprises the steps of cutting the field-ripened seed flax in swaths and drying, combining the flax to separate the flax seed from the straw in the field, depositing the separated flax straw at random in loose windrows on the stubble field, subjecting the flax straw to a field weathering treatment comprising exposing the straw to alternate wettings and dryings while in said windrows, mechanically liberating the bast fibers of the weathered straw from the shivey material by braking the straw, scutching and forming a tow of bast fibers oriented at random.

13. The method of preparing mature seed flax for the mechanical liberation of fibers which comprises the steps of combining the flax to separate the flax seed from the straw in the field, depositing the separated flax straw in windrows on the cut-over stubble field, and subjecting the flax straw to a field weathering treatment comprising exposing the straw to alternate wettings and dryings while in said windrows.

14. The method of producing mature seed flax for the preparation of fine linen yarns which comprises the steps of cutting mature seed flax plants having seed and straw portions so as to leave a stubble, separating the seed from the straw by combining and depositing the straw at random in a loose windrow on the stubble, subjecting the flax straw to a field weathering treatment comprising exposing the straw to alternate wettings and dryings while in said windrows and then separating the bast fibers of the field weathered straw from the shives to form a tow of randomly oriented fibers.

15. The method according to claim 11 further characterized in that the fibers are carded.

References Cited in the file of this patent

UNITED STATES PATENTS

| | | |
|---|---|---|
| 1,209,546 | Brolin | Dec. 19, 1916 |
| 2,468,771 | Montonna | May 3, 1949 |